US012787915B2

(12) United States Patent
Coppinger, II et al.

(10) Patent No.: US 12,787,915 B2
(45) Date of Patent: Nov. 10, 2026

(54) PIVOT ASSEMBLY FOR AN ARM OF AN AGRICULTURAL HEADER

(71) Applicant: CNH Industrial America LLC, New Holland, PA (US)

(72) Inventors: Jason R. Coppinger, II, Davenport, IA (US); Benjamin Kemmerer, Hamburg, PA (US); Joel T. Cook, Akron, PA (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 323 days.

(21) Appl. No.: 18/682,379

(22) PCT Filed: Aug. 9, 2022

(86) PCT No.: PCT/US2022/039788
§ 371 (c)(1),
(2) Date: Feb. 8, 2024

(87) PCT Pub. No.: WO2023/018687
PCT Pub. Date: Feb. 16, 2023

(65) Prior Publication Data

US 2025/0129816 A1 Apr. 24, 2025

(51) Int. Cl.
*A01D 34/28* (2006.01)
*A01D 34/04* (2006.01)

(52) U.S. Cl.
CPC ............ *A01D 34/283* (2013.01); *A01D 34/04* (2013.01)

(58) Field of Classification Search
CPC .... A01D 34/283; A01D 34/28; A01D 34/286; A01D 34/44
See application file for complete search history.

(56) References Cited

U.S. PATENT DOCUMENTS

| | | | | |
|---|---|---|---|---|
| 2,413,873 | A | 1/1947 | Hume | |
| 3,038,366 | A * | 6/1962 | Hindman | F16B 37/0892 411/433 |
| 8,230,670 | B2 | 7/2012 | Schmidt | |
| 10,433,486 | B2 | 10/2019 | Vandeven | |
| 2014/0075912 | A1 | 3/2014 | Fuechtling | |

(Continued)

FOREIGN PATENT DOCUMENTS

| | | | |
|---|---|---|---|
| EP | 2702851 | A2 | 3/2014 |
| WO | 2020101855 | A1 | 5/2020 |
| WO | 2020101859 | A1 | 5/2020 |

OTHER PUBLICATIONS

International Search Report and Written Opinion prepared for PCT Application No. PCT/US2022/039788 dated Nov. 24, 2022 (14 pages).

(Continued)

*Primary Examiner* — Giovanna Wright
(74) *Attorney, Agent, or Firm* — Dority & Manning, P.A.

(57) ABSTRACT

A pivot assembly for an arm of an agricultural header includes a fastener coupled to a frame of the agricultural header and a cross-member coupled to the fastener. The cross-member extends at least partially through a slot in the arm, and the cross-member is configured to move along the slot in the arm and to engage an end of the slot in the arm to limit a range of motion of the arm relative to the frame.

20 Claims, 8 Drawing Sheets

(56) References Cited

U.S. PATENT DOCUMENTS

| | | | | |
|---|---|---|---|---|
| 2019/0110404 | A1 | 4/2019 | Vandeven | |
| 2021/0120740 | A1* | 4/2021 | Martin | A01D 57/04 |
| 2021/0274706 | A1 | 9/2021 | Cook | |

OTHER PUBLICATIONS

Substantive Technical Examination Report for Argentina Patent App. No. 20220102135, notified via Patent Gazette No. 1485 issued on Jan. 14, 2026, 11 pages, with partial translation.

* cited by examiner

PIVOT ASSEMBLY FOR AN ARM OF AN AGRICULTURAL HEADER

BACKGROUND

The present disclosure relates generally to a pivot assembly for an arm of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain agricultural crops that include grain (e.g., barley, corn, flax, oats, rye, wheat). During operation of the harvester, the harvesting process may begin by removing a plant from a field, such as by using a header. The header may cut the agricultural crops and transport the cut agricultural crops to a processing system of the harvester. The header may include a cutter bar assembly configured to cut a portion of each agricultural crop (e.g., a stalk), thereby separating the cut agricultural crop from the soil. The cutter bar assembly may extend along a substantial portion of a width of the header at a forward end of the header.

BRIEF DESCRIPTION

In one embodiment, a pivot assembly for an arm of an agricultural header includes a fastener coupled to a frame of the agricultural header and a cross-member coupled to the fastener. The cross-member extends at least partially through a slot in the arm, and the cross-member is configured to move along the slot in the arm and to engage an end of the slot in the arm to limit a range of motion of the arm relative to the frame.

In one embodiment, an arm assembly for an agricultural header includes an arm configured to rotate about a pivot axis relative to a frame of the agricultural header and a pivot assembly extending at least partially through the arm. The arm is configured to support a cutter bar assembly of the agricultural header. The pivot assembly is configured to move along the arm and to limit a range of motion of the arm.

In one embodiment, an agricultural header includes a frame, an arm configured to rotate about a pivot axis relative to the frame, and a pivot assembly coupled to the frame. The pivot assembly is configured to engage the arm to limit a range of motion of the arm relative to the frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
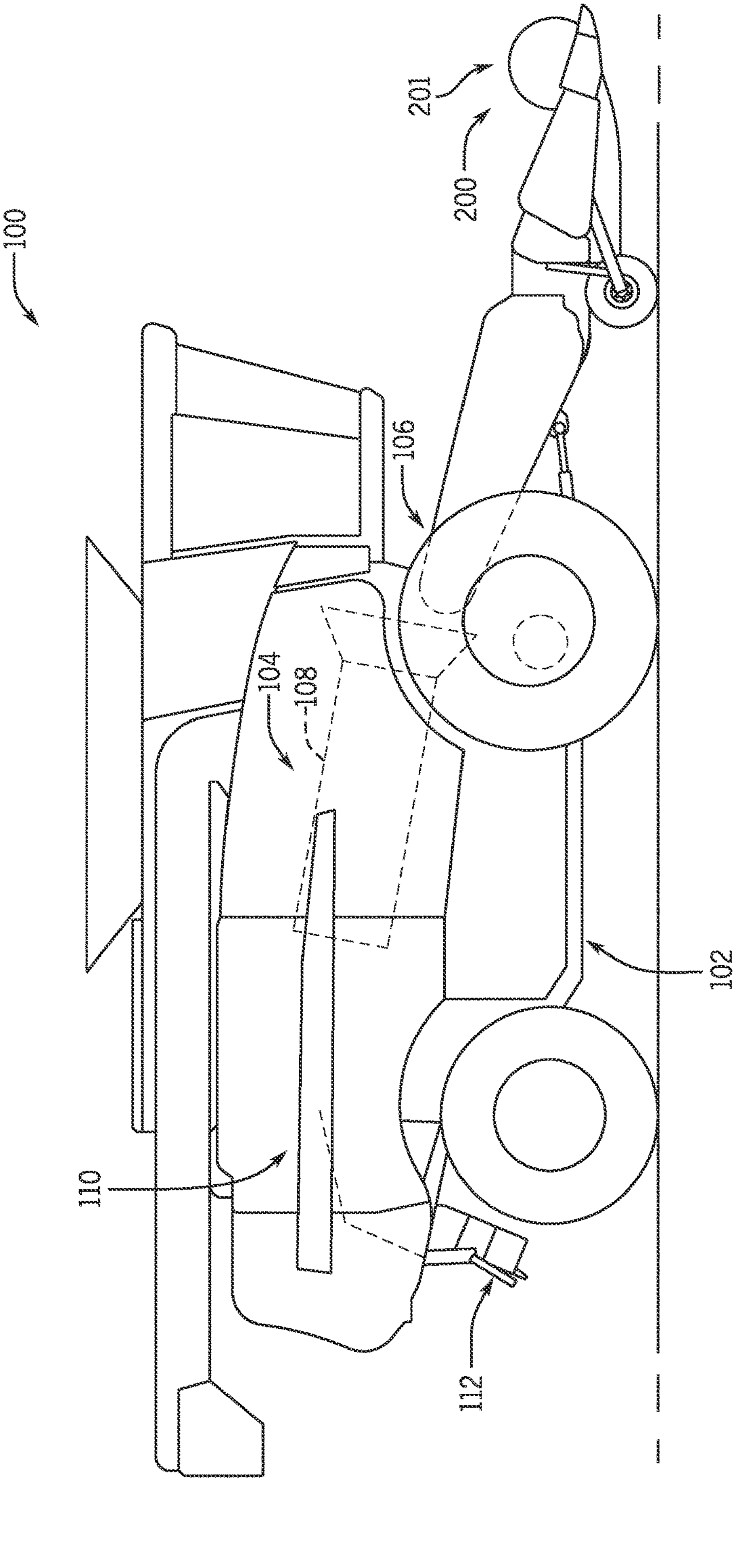
FIG. 1 is a side view of an embodiment of an agricultural harvester, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

An agricultural harvester may include a header having a cutter bar assembly. The cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along a width of the respective blade assembly. As the moving blade assembly is driven to oscillate, the blades of the moving blade assembly move relative to the blades of the stationary blade assembly. As the header is moved through the field by the agricultural harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop. The header may include belts that move the cut crops toward an inlet of an agricultural crop processing system. In some embodiments, the header may include a reel assembly that directs the portion of the crop toward the cutter bar assembly and/or directs the cut crops from the cutter bar assembly toward the belts.

The cutter bar assembly may be flexible along a width of the header. In such cases, the cutter bar assembly may be supported by multiple longitudinally-extending arms distributed along the width of the header. Each arm may be pivotally mounted to a frame of the header, thereby enabling the cutter bar assembly to flex during operation of the agricultural harvester. While the flexible cutter bar assembly is in contact with the soil surface, the flexible cutter bar assembly may follow the contours of the field, thereby enabling a cutting height to be substantially constant along the width of the header. If a greater cutting height is desired (e.g., based on the field conditions, the types of crops being harvested), the header may be raised such that the flexible cutter bar assembly is positioned above the soil surface. In addition, if a substantially rigid cutter bar is desired (e.g., for certain field conditions, for harvesting certain types of crops), the pivoting movement of each arm may be blocked, thereby substantially reducing the flexibility of the cutter bar assembly. It is now recognized that the cutter bar assembly may be out-of-level due to wear, use, loads on the cutter bar assembly, manufacturing tolerances, and other factors, such that a portion of the cutter bar assembly may not be positioned at the desired height above the soil surface. For example, loads on the cutter bar assembly may be caused by contact of the cutter bar assembly and/or other portions of the header with obstacles, such as a fence, a dirt mound (e.g., the cutter bar assembly scooping dirt from the soil surface), and other foreign objects. The out-of-level cutter bar assembly may inhibit cutting crops at the desired height and performance of the header generally.

Turning to the drawings, FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. For example, the header 200 includes a reel assembly 201 configured to direct cut crops toward belts that convey the crops toward the inlet of the agricultural crop processing system 104. In certain embodiments, the reel assembly 201 may be omitted. The agricultural crop processing system 104 receives the cut crops from the header 200 and separates desired crop material (e.g., grain) from crop residue (e.g., husks and pods). For example, the agricultural crop processing system 104 may include a thresher 108 having a cylindrical threshing rotor that transports the cut crops in a helical flow path through the agricultural harvester 100. In addition to transporting the cut crops, the thresher 108 may separate the desired crop material from the crop residue and may enable the desired crop material to flow into a cleaning system located beneath the thresher 108. The cleaning system may remove debris from the desired crop material and transport the desired crop material to a storage compartment within the agricultural harvester 100. The crop residue may be transported from the thresher 108 to a crop residue handling system 110, which may remove the crop residue from the agricultural harvester 100 via a crop residue spreading system 112 positioned at an aft end of the agricultural harvester 100.

As discussed in detail below, the header 200 includes a cutter bar assembly configured to cut the crops within the field. The cutter bar assembly is configured to flex along a width of the header to enable the cutter bar assembly to substantially follow the contours of the field while the cutter bar assembly is engaged with the soil surface. The cutter bar assembly is supported by multiple longitudinally extending arm assemblies distributed along the width of the header. Each arm assembly is pivotally mounted to a frame of the header, thereby enabling the cutter bar assembly to flex. Additionally, each arm assembly may have a range of motion (e.g., float) relative to the frame. If a substantially rigid cutter bar is desired (e.g., for certain field conditions, for harvesting certain types of crops), the pivoting movement of each arm may be blocked, thereby substantially reducing the flexibility of the cutter bar assembly.

Each arm assembly may include an arm coupled to the cutter bar assembly and a pivoting mechanism (e.g., pivot system or pivot assembly) coupled to the frame of the header 200. The pivoting mechanism may extend at least partially through the arm and may limit the range of motion of the arm about a pivot axis and relative to the frame. For example, a first end of the arm may be coupled to the frame at the pivot axis, and a second end of the arm may be coupled to the cutter bar assembly. The pivoting mechanism may also be coupled to the frame adjacent to the pivot axis of the arm. As the arm pivots about the pivot axis, the pivoting mechanism may limit the range of motion (e.g., pivoting motion) of the arm. In some instances, the cutter bar assembly may become out-of-level due to wear, use, loads on the cutter bar assembly, manufacturing tolerances, and other factors, such that a portion of the cutter bar assembly may not be positioned at the desired height above the soil surface. The pivoting mechanism may be adjustable to adjust the range of motion of the arm and/or to maintain a level of the arm relative to other arms coupled to the cutter bar assembly, thereby maintaining a common level of the cutter bar assembly.

Figure 2:
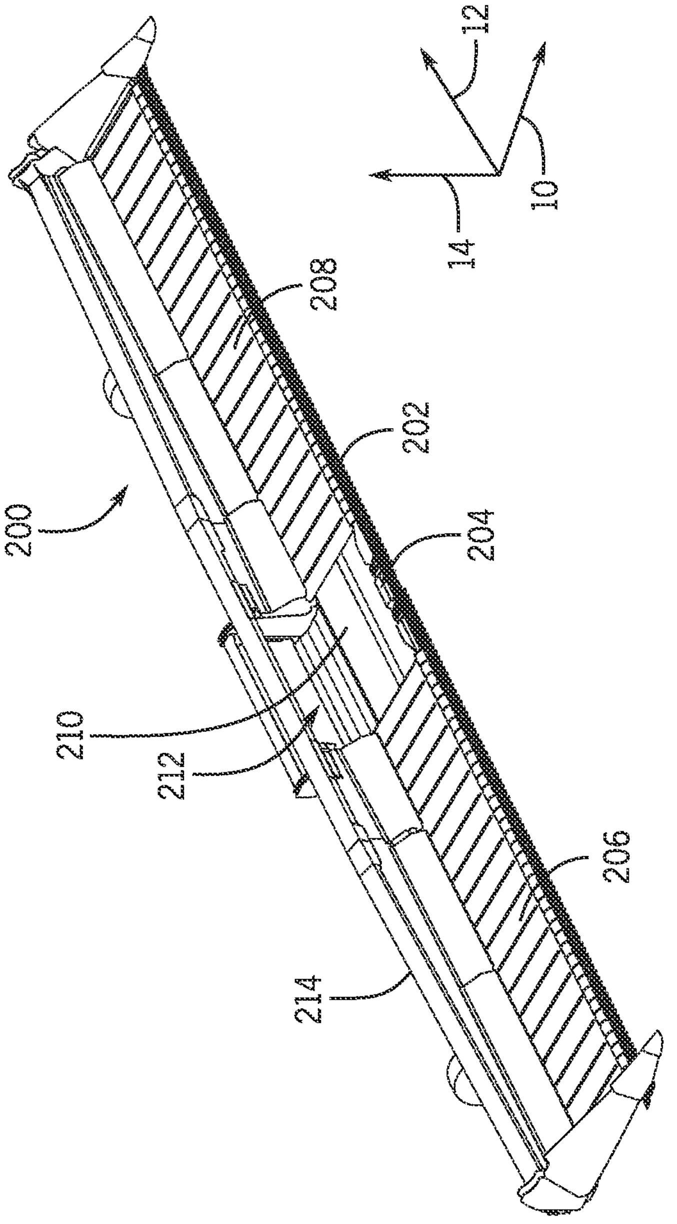
FIG. 2 is a perspective view of an embodiment of a header that may be employed within the agricultural harvester of FIG. 1, in accordance with an aspect of the present disclosure.

FIG. 2 is a perspective view of an embodiment of the header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200 and relative to a direction of travel of the header 200 during harvesting operations. As illustrated, the cutter bar assembly 202 extends along a substantial portion of the width of the header 200 (e.g., the extent of the header 200 along a lateral axis 12). The cutter bar assembly 202 includes a cutter bar, a stationary blade assembly, and a moving blade assembly. The moving blade assembly is coupled to the cutter bar (e.g., above the cutter bar relative to a vertical axis 14 of the header 200), and the cutter bar/moving blade assembly is driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header). As the agricultural harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the lateral belts 206, 208 are driven laterally inwardly to the longitudinal belt 210 due to the movement of the lateral belts 206, 208. In addition, agricultural crops that contact the longitudinal belt 210 and the agricultural crops provided to the longitudinal belt 210 by the lateral belts 206, 208 are driven rearwardly along the longitudinal axis 10 due to the movement of the longitudinal belt 210. Accordingly, the belts move the cut agricultural crops through an opening 212 in the header 200 to the inlet of the agricultural crop processing system. In certain embodiments, the header 200 may include an auger in the opening 212 that facilitates directing the cut crops into the agricultural crop processing system.

In the illustrated embodiment, the cutter bar assembly 202 is flexible along the width of the header 200 (e.g., the extent of the header 200 along the lateral axis 12). As discussed in detail below, the cutter bar assembly 202 is supported by multiple arm assemblies extending along the longitudinal axis 10 and distributed along the width of the header 200 (e.g., along the lateral axis 12 of the header 200). Each arm assembly is mounted to a frame 214 of the header 200 and configured to rotate about a pivot axis relative to the frame 214. As a result, the cutter bar assembly 202 may flex during operation of the agricultural harvester. The flexible cutter bar assembly 202 may follow the contours of the field while the cutter bar assembly 202 is in contact with the surface of the field, thereby enabling the cutting height (e.g., the height at which each crop is cut) to be substantially constant along the width of the header 200 (e.g., the extent of the header 200 along the lateral axis 12). However, if a substantially rigid cutter bar assembly is desired (e.g., for certain field conditions, for harvesting certain types of crops), the pivoting movement of the arm assemblies may be blocked, thereby substantially reducing the flexibility of the cutter bar assembly 202.

Figure 3:
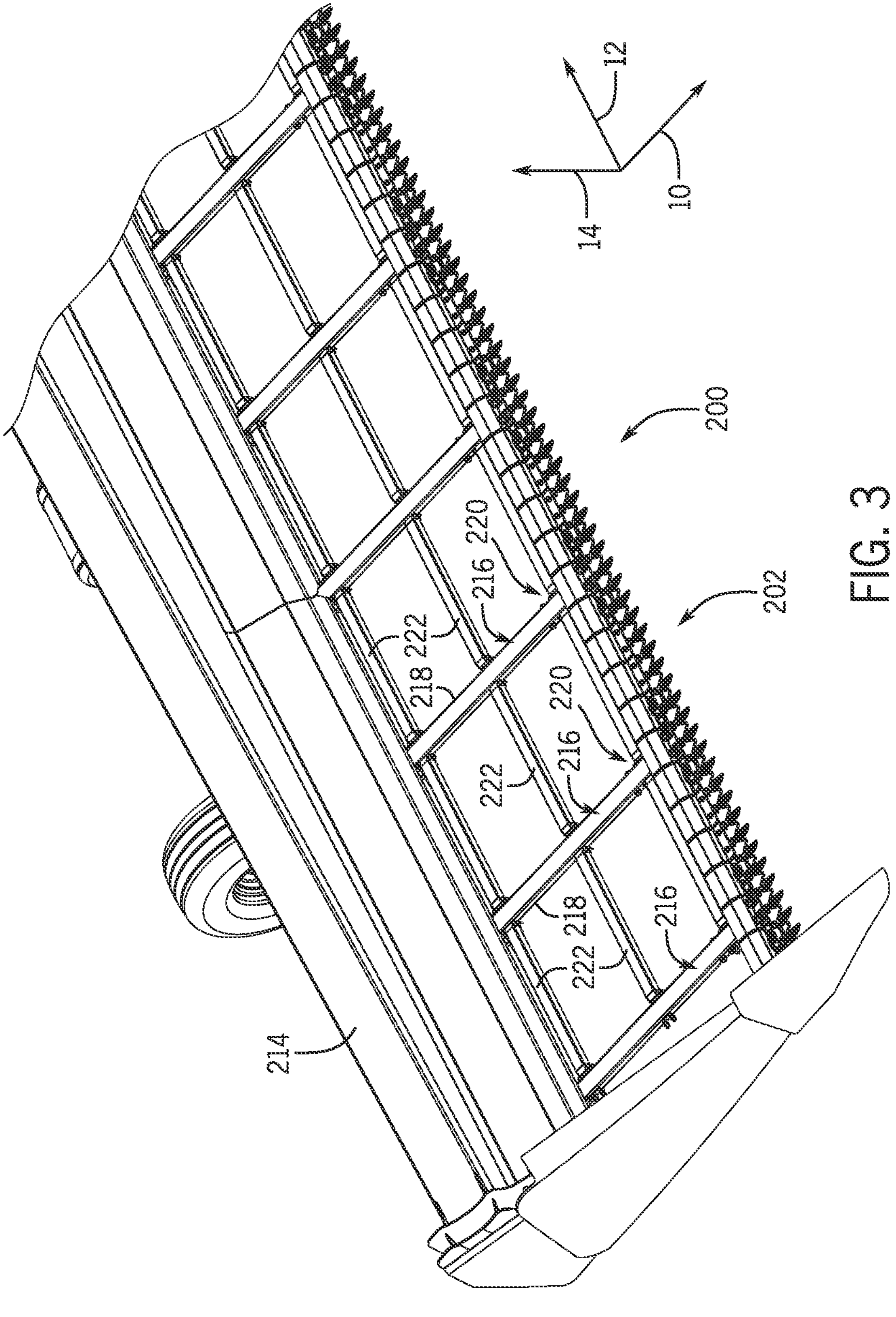
FIG. 3 is a perspective view of a portion of the header of FIG. 2, including a frame, a cutter bar assembly, and arm assemblies that support the cutter bar assembly, in accordance with an aspect of the present disclosure.

FIG. 3 is a perspective view of an embodiment of a portion of the header 200 of FIG. 2, including the cutter bar assembly 202 and arm assemblies 216 that support the cutter bar assembly 202. As illustrated, each arm assembly 216 extends substantially along the longitudinal axis 10. However, in alternative embodiments, each arm assembly may extend in any suitable direction. In the illustrated embodiment, the arm assemblies 216 are distributed along the width of the header 200 (e.g., the extent of the header along the lateral axis 12). The spacing between the arm assemblies 216 may be selected to enable the arm assemblies 216 to support the cutter bar assembly 202 and to enable the cutter bar assembly 202 to flex during operation of the header 200 (e.g., while the cutter bar assembly 202 is in the flexible configuration).

As discussed in detail below, each arm assembly 216 includes an arm 218 coupled to the cutter bar assembly 202 at an end 220 (e.g., end portion, first end) of the arm 218 and pivotally coupled to the frame 214 at an end (e.g., end portion, second end) of the arm 218 (e.g., a second end opposite the end 220). The coupling between each arm 218 and the frame 214 is a respective pivot joint, and the pivot joint is configured to enable the respective arm assembly 216 to rotate relative to the frame 214 about a respective pivot axis. In the illustrated embodiment, lateral supports 222 extend between adjacent pairs of arms 218. A first end of each lateral support 222 is pivotally coupled to one arm 218, and a second end of each lateral support 222 is pivotally coupled to another arm 218. The lateral supports 222 are configured to support the respective lateral belt, while enabling the arm assemblies 216 to rotate about the respective pivot axes relative to the frame 214. While three lateral supports are positioned between each pair of arms in the illustrated embodiment, in other embodiments, more or fewer lateral supports may be positioned between at least one pair of arms (e.g., 1, 2, 3, 4, 5, 6). Furthermore, in certain embodiments, the lateral supports may be omitted between at least one pair of arms.

Figure 4:
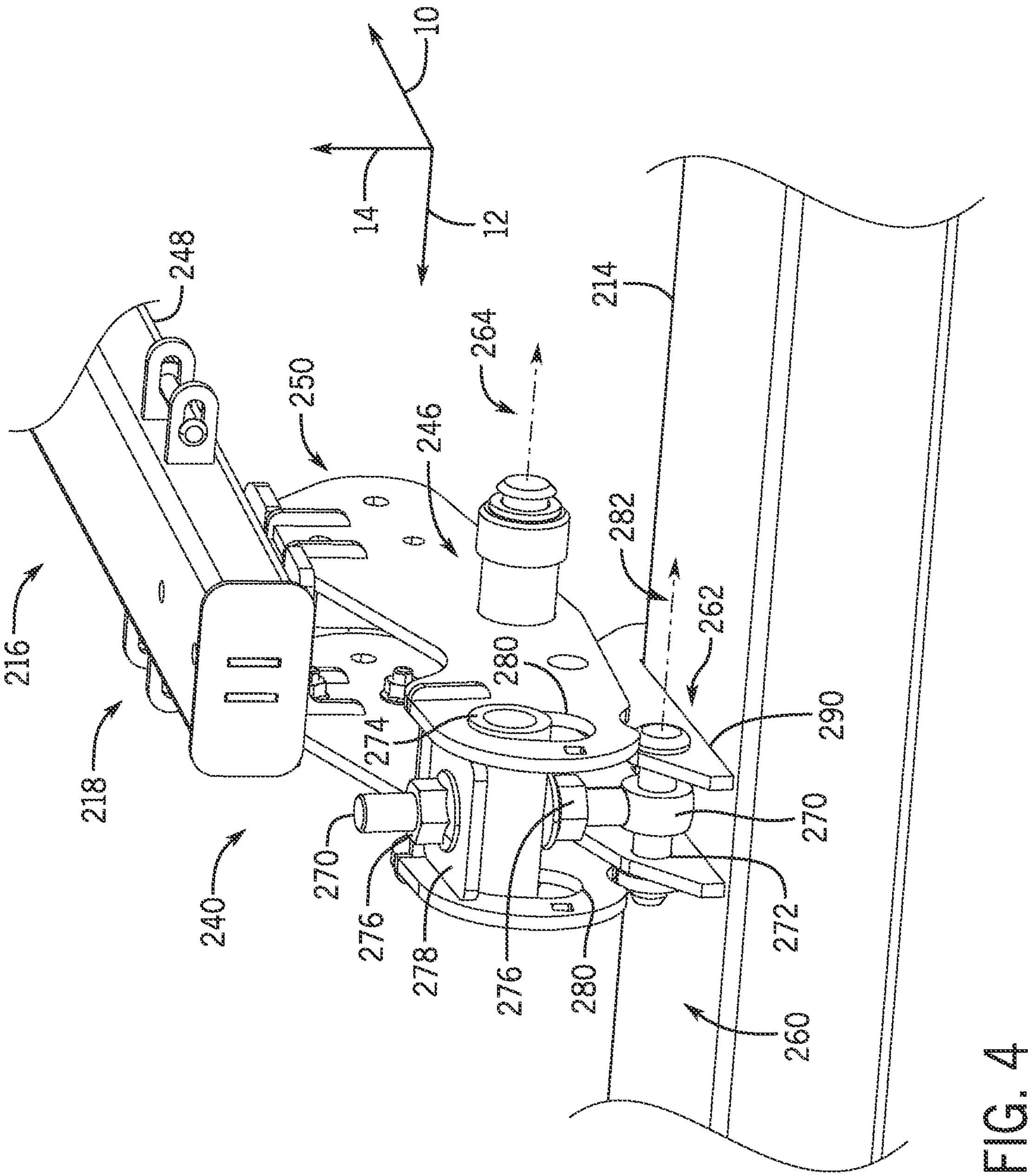
FIG. 4 is a rear perspective view of an embodiment of an arm assembly coupled to the frame of FIG. 3, in accordance with an aspect of the present disclosure.

FIG. 4 is a rear perspective view of an embodiment of the arm assembly 216 of FIG. 3. As illustrated, the arm assembly 216 includes the arm 218 having an end 240 (e.g., a second end) disposed generally opposite the end 220 shown in FIG. 3 along the longitudinal axis 10. As discussed above, the end 220 shown in FIG. 3 is configured to couple to the cutter bar assembly 202 shown in FIG. 3. As illustrated, the end 240 is pivotally coupled to the frame 214 at a pivot joint 246. In particular, the arm 218 includes a member 248 and a bracket 250 coupled to the member 248 and to the frame 214. In certain embodiments, the bracket 250 may be secured to the member 248 via fastener(s) and/or weld(s). In some embodiments, the bracket 250 may be integrally formed with the member 248.

Additionally, the arm assembly 216 includes a pivoting mechanism 260 (e.g., pivot system or pivot assembly) coupled to the frame 214 via a pivot joint 262. The pivoting mechanism 260 may limit a range of motion of the arm 218 relative to the frame 214 and about the lateral axis 12 (e.g., about a pivot axis 264 extending along and/or parallel to the lateral axis 12). The pivoting mechanism 260 includes a fastener 270, an additional fastener 272 that couples the fastener 270 to the frame 214 (e.g., the additional fastener 272 contacts and is directly coupled to the frame 214 and to the fastener 270; non-rotatably coupled), a cross-member 274, nuts 276 coupled to (e.g., threaded onto) the fastener 270, and a plate 278 disposed between one of the nuts 276 and the cross-member 274. The fastener 270 extends through the cross-member 274, and the nuts 276 secure (e.g., rigidly couple; non-rotatably couple) the cross-member 274 to the fastener 270. The cross-member 274 extends at least partially through slots 280 of the bracket 250 of the arm 218, such that the end 240 of the arm 218 interfaces with the pivoting mechanism 260 at the slots 280. While the slots 280 are shown as through holes or openings, it should be appreciated that the slots 280 may instead be grooves or recesses that support/engage the cross-member 274.

As the arm 218 pivots about the pivot axis 264 at the pivot joint 246, the pivoting mechanism 260, via the cross-member 274, may limit the range of motion of the arm 218. For example, as the arm 218 pivots about the pivot axis 264, the slots 280 may move relative to the cross-member 274. The range of motion of the arm 218 may be defined by a length of the slots 280 and a position of the cross-member 274 along the fastener 270. As explained in greater detail below with reference to FIGS. 5 and 6, the position of the cross-member 274 along the fastener 270 is adjustable, such that the range of motion of the arm 218 is adjustable. In some embodiments, the arm 218 may be locked in place by securing the cross-member 274 at a bottom end of the slots 280. In particular, the range of motion of the arm 218 may be adjusted via the pivoting mechanism 260 to account for the range of motion not matching a range of motion of other arms 218, which may lead to the cutter bar assembly 202 being out-of-level.

The pivoting mechanism 260 (e.g., at least the fastener 270, the cross-member 274, the nuts 276, and the plate 278) may also pivot at the pivot joint 262 about a pivot axis 282 (e.g., additional pivot axis) extending through the additional fastener 272. For example, a range of motion of the pivoting mechanism 260 at the pivot joint 262 may be about 0.1 degrees, 0.5 degrees, 1 degree, 2 degrees, 3 degrees, 5 degrees, and so on. The pivot axis 282 at the pivot joint 262 may extend parallel to the lateral axis 12 and/or parallel to the pivot axis 264 at the pivot joint 246. Movement of the arm 218 may cause the pivoting mechanism 260 to pivot at the pivot joint 262. In certain embodiments, the pivoting mechanism 260 may be rigidly coupled to the frame 214, such that the pivoting mechanism 260 is blocked from pivoting relative to the frame 214. In such embodiments, the slots 280 may include a gap on sides of the cross-member 274 along the longitudinal axis 10 to enable movement of the arm 218 relative to the pivoting mechanism 260.

As illustrated, the cross-member 274 is a cylindrical bushing disposed generally perpendicular to the fastener 270 (e.g., respective central axes are transverse or generally perpendicular), and the slots 280 have circular ends, such that the circular ends and the cross-member 274 are generally concentric. In certain embodiments, a shape of the cross-member 274 and/or shapes of the ends of the slots 280 may be different. For example, the cross-member 274 may be a cylindrical block (e.g., a solid block), a square or rectangular bar (e.g., tubing or a solid square block), and the slots 280 (e.g., ends of the slots 280) may have a geometry that generally matches the square or rectangular bar. In some embodiments, the cross-member 274 may be threaded to enable the cross-member 274 to screw onto the threads of the fastener 270. In other embodiments, threads may be omitted from the cross-member 274. In certain embodiments, the cross-member 274 may include aperture(s) through which the fastener 270 passes.

Additionally, as illustrated, the fastener 270 is an eye bolt. As explained in greater detail in reference to FIG. 6, the fastener 270 may include an eye portion that extends about the additional fastener 272 and a threaded portion that extends through the cross-member 274 and the nuts 276. In certain embodiments, the fastener 270 may be a different type of fastener, such as a simple bolt, a screw, or another suitable fastener. In some embodiments, the pivoting mechanism 260 may include component(s) other than the fastener 270 that couple (e.g., pivotally couple) the cross-member 274 to the frame 214.

The frame 214 includes a bracket 290 in the illustrated embodiment. The additional fastener 272 is secured to the bracket 290. In certain embodiments, the pivoting mechanism 260 may include the bracket 290. In some embodiments, the bracket 290 may be integral to the frame 214. Additionally, as illustrated, the fastener 270 extends generally from and perpendicular to the frame 214, and the additional fastener 272 and the cross-member 274 extend generally parallel to the frame 214 (e.g., respective central axes are generally perpendicular to a respective central axis of the fastener 270).

As described above, the header 200 may include multiple arm assemblies 216 that support the cutter bar assembly 202. In certain embodiments, each arm assembly 216 may include a respective pivoting mechanism 260 that limits the range of motion of the arm assembly 216. In other embodiments, only some (e.g., one or more) of the arm assemblies 216 may include the pivoting mechanism 260, such that only those arm assemblies 216 are limited by the pivoting mechanism 260.

Figure 5:
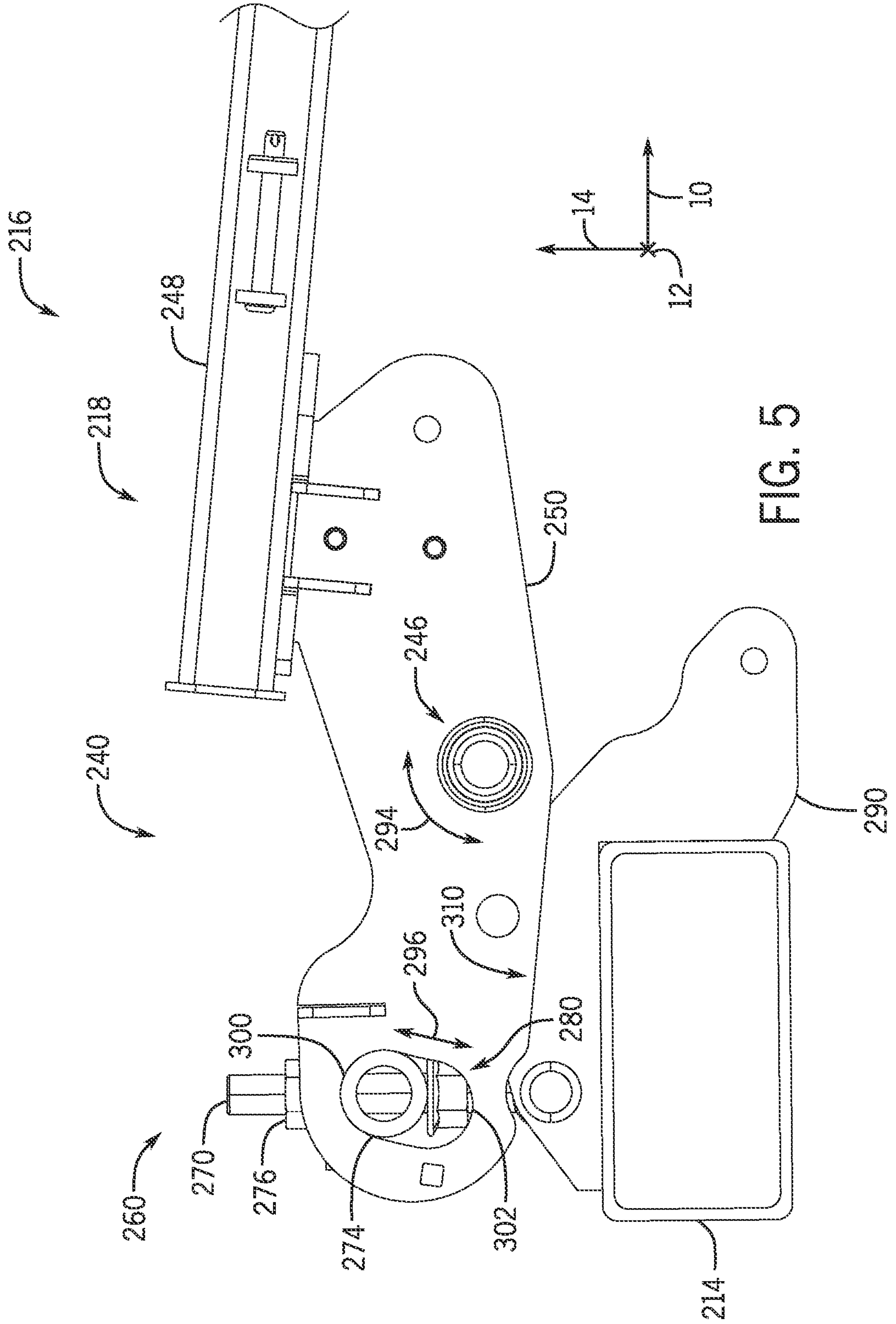
FIG. 5 is a side view of the arm assembly of FIG. 4, including a pivoting mechanism coupled to the frame and an arm coupled to the pivoting mechanism, in accordance with an aspect of the present disclosure.

To illustrate the range of motion of the arm assembly 216 of FIG. 4, FIG. 5 is a side view of the arm assembly 216 coupled to the frame 214. The arm 218 of the arm assembly 216 is configured to pivot at the pivot joint 246, as indicated by arrows 294, to enable the cutter bar assembly 202 coupled to the end 220 (FIG. 3) of the arm 218 to flex. For example, the arm 218 may pivot about 1 degree, 2 degrees, 3 degrees, 5 degrees, 10 degrees, and so on. As the arm 218 and the bracket 250 coupled thereto pivot, the slots 280 of the bracket 250 move relative to the cross-member 274 of the pivoting mechanism 260, as indicated by arrows 296.

The slots 280 include an upper end 300 and a lower end 302 opposite the upper end 300. As illustrated, the cross-member 274 is positioned in the upper end 300, such that the end 240 of the arm 218 is blocked from moving downwardly. Accordingly, the opposite end (e.g. the end 220) of the arm 218 is blocked from moving upwardly, such that the illustrated position of the arm 218 corresponds to a maximum height of the cutter bar assembly 202 at the arm 218 (e.g., relative to the frame 214 and/or a soil surface). During operation, such as during movement of the header 200 and/or movement of the agricultural harvester 100 generally, the arm 218 may pivot about the pivot joint 246, and the end 240 may move upwardly. As the end 240 moves upwardly, the lower end 302 of the slots 280 move toward the cross-member 274, and the cutter bar assembly 202 moves downwardly at the arm 218. When the lower end 302 of the slots 280 contacts the cross-member 274, the end 240 of the arm 218 is blocked from moving upwardly, which may correspond to a minimum height of the cutter bar assembly 202 at the arm 218 (e.g., relative to the frame 214 and/or a soil surface). Accordingly, a length of the slots 280 from the upper end 300 to the lower end 302 may at least partially define a range of motion of the arm 218.

Additionally, the range of motion of the arm 218 (and/or the maximum height and/or a minimum height of the cutter bar assembly 202 at the arm 218) may be adjusted by adjusting a position of the cross-member 274 relative to and along the fastener 270. For example, the nuts 276 and the cross-member 274 may be adjusted upwardly along the fastener 270 to adjust the overall movement of the end 240 upwardly (e.g., a location of such movement), thereby adjusting the overall movement of the cutter bar assembly 202 at the arm 218 downwardly (e.g., decreasing the maximum height and the minimum height of the cutter bar assembly 202 at the arm 218). Likewise, the nuts 276 and the cross-member 274 may be adjusted downwardly along the fastener 270 to adjust the overall movement of the end 240 downwardly (e.g., a location of such movement), thereby adjusting the overall movement of the cutter bar assembly 202 at the arm 218 upwardly (e.g., increasing the maximum height and the minimum height of the cutter bar assembly 202 at the arm 218).

The position of the cross-member 274 along the fastener 270 may be adjusted while the pivoting mechanism 260 is coupled to the header 200 and/or prior to installation on the header 200. For example, the fastener 270 may remain coupled to the frame 214, and the cross-member 274 may remain disposed in the slots 280 while the cross-member 274 is adjusted. To adjust the cross-member 274, the nuts 276 may be loosened and/or removed and tightened against the cross-member 274 and/or the plate 278 after moving the cross-member 274 and the plate 278 along the fastener 270. Accordingly, the pivoting mechanism 260 may facilitate adjustments to the range of motion of the arm 218 while the arm 218 and the pivoting mechanism 260 remain coupled to the header 200, thereby reducing potential delays and down-time to perform such adjustments.

Adjusting the range of motion of the arm assembly 216 (e.g., a location of the range of motion), via the adjustment to the cross-member 274 of the pivoting mechanism 260, may enable a user to quickly and efficiently maintain a level cutter bar assembly 202 and/or to match the range of motion of the arm assembly 216 with the range of motion of other arm assemblies 216. Accordingly, such adjustments may facilitate maintaining the cutter bar assembly 202 at a desired height of the soil surface.

Figure 6:
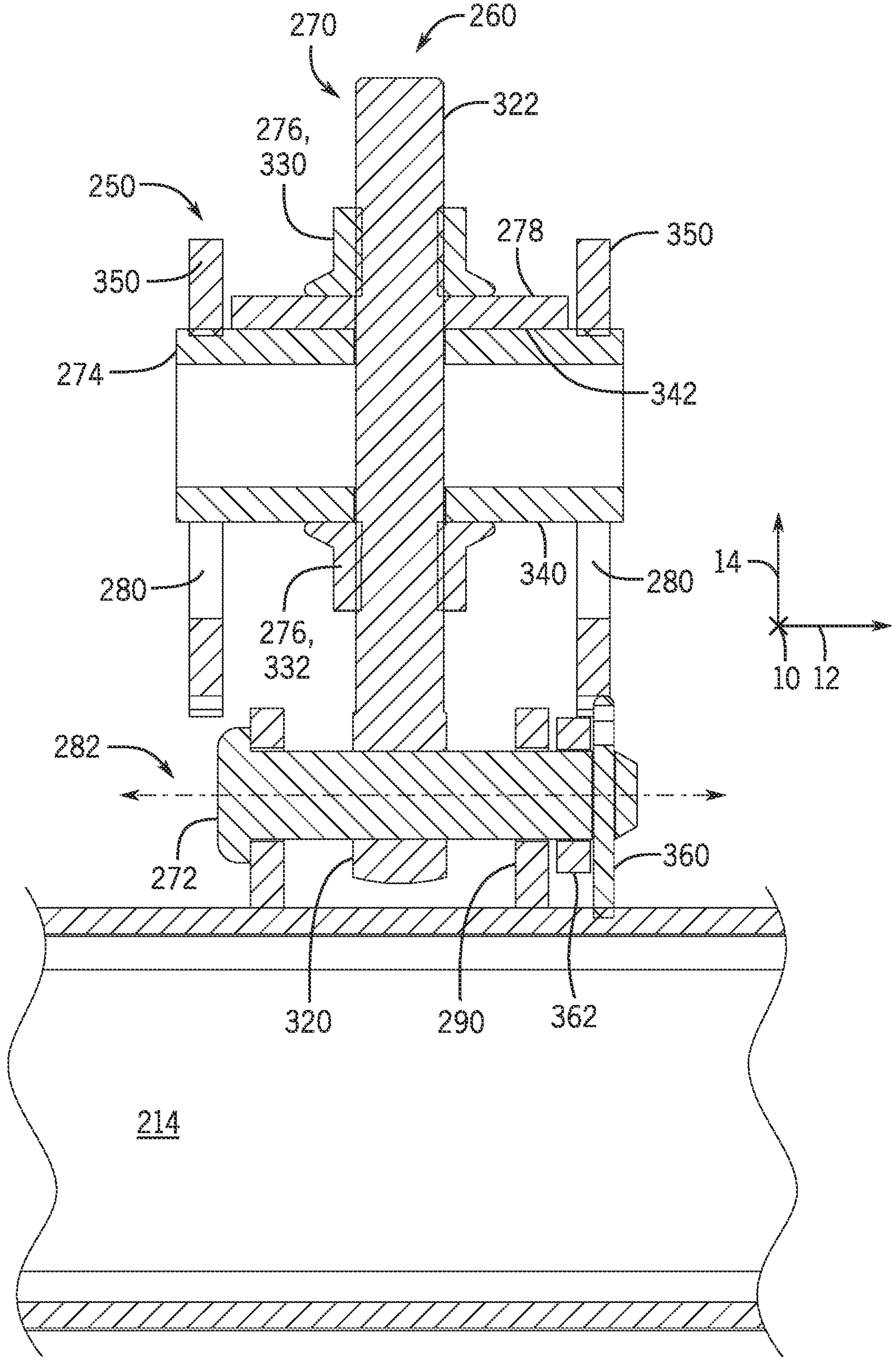
FIG. 6 is a front cross-sectional view of the arm assembly of FIGS. 4 and 5, in accordance with an aspect of the present disclosure.

FIG. 6 is a front cross-sectional view of an embodiment of the arm assembly 216 of FIG. 5. As illustrated, the fastener 270 includes an eye portion 320 coupled to (e.g., wrapped around) the additional fastener 272 and a threaded portion 322 coupled to the nuts 276. Additionally, the threaded portion 322 extends through the cross-member 274 and the plate 278. The fastener 270 may pivot (e.g., by about 2 degrees) about the additional fastener 272 while the arm 218 pivots. The nuts 276 include an upper nut 330 disposed against the plate 278 and a lower nut 332 disposed against the cross-member 274 (e.g., against a lower portion 340 of the cross-member 274). The nuts 276 may secure the cross-member 274 and the plate 278 against one another and to the fastener 270. In some embodiments, the pivoting mechanism 260 may include only one nut 276 and/or one nut 276 (e.g., the lower nut 332) may be permanently secured to the fastener 270, such as via a weld.

The plate 278 is disposed between sides 350 of the bracket 250 and against an upper portion 342 of the cross-member 274. Movement of the pivoting mechanism 260 along the lateral axis 12 may be limited by the plate 278. For example, the plate 278 may contact one or both of the sides 350 of the bracket 250 to limit motion of the pivoting mechanism 260 along the lateral axis 12 (e.g., to limit a lateral range of motion of the pivoting mechanism 260). In some embodiments, the plate 278 may be integrally formed with the cross-member 274 and/or permanently secured to the cross-member 274, such as via a weld. In certain embodiments, the plate 278 may be positioned between the lower nut 332 and the lower portion 340 of the cross-member 274 instead of between the upper nut 330 and the upper portion 342 of the cross-member 274.

In some embodiments, additional washer(s) and/or plate (s) (e.g., plate(s) similar to the plate 278) may be added to the pivoting mechanism 260 to adjust the relative position of the cross-member 274 along the fastener 270. For example, the additional washer(s) and/or plate(s) may be disposed between the upper nut 330 and the plate 278, between the plate 278 and the upper portion 342 of the cross-member 274, and/or between the lower nut 332 and the lower portion 340 of the cross-member 274.

As illustrated, the pivoting mechanism 260 includes a pin 360 coupled to the additional fastener 272 and a washer 362 disposed between the pin 360 and the bracket 290 of the frame 214. The pin 360 and the washer 362 may secure the additional fastener 272 to the bracket 290. In some embodiments, the washer 362 may be omitted, and the pin 360 may be disposed generally against the bracket 290. The pin 360 may be a cotter pin or another suitable mechanism that secures the additional fastener 272 to the bracket 290. It should be appreciated that the additional fastener 272 may be coupled to the bracket 290 via any of a variety of fasteners or other techniques.

In certain embodiments, the arm assembly 216 may include an adjustment lever coupled to the second end 240 of the arm assembly 216 that facilitates adjusting a range of motion of the arm assembly 216. For example, the adjustment lever may provide an easily accessible mechanism that allows a user to raise or lower the second end 240 of the arm assembly 216 while adjusting positions of one or both nuts 276 along the fastener 270, thereby allowing the user to quickly and efficiently adjust the range of motion of the arm assembly 216. In some embodiments, the adjustment lever may be coupled to multiple arm assemblies 216 and/or may be locked in place while the user is adjusting the nuts 276 along the fastener 270.

In some embodiments, the pivoting mechanism 260 may include a hydraulic cylinder in place of or in addition to the fastener 270, the cross-member 274, and/or the nuts 276. For example, the hydraulic cylinder may be coupled to the cross-member 274 and may be adjustable to adjust the position of the cross-member 274 along the slots 280. In certain embodiments, each pivoting mechanism 260, and/or the header 200 generally, may include a controller having a memory and a processor. The controller may adjust the hydraulic cylinder to control the position of the cross-member 274 along the slots 280, thereby facilitating user adjustments of the range of motion of the arm assemblies 216 and a level/height of the cutter bar assembly 202. For example, a user positioned remotely from the pivoting mechanism 260, such as in a cab of the agricultural harvester 100, may provide an input to the controller indicative of instructions to adjust the level of one or more pivoting mechanisms 260. In response, the controller may perform the adjustments at the pivoting mechanisms 260, such as by adjusting a hydraulic cylinder of each pivoting mechanism 260.

Figure 7:
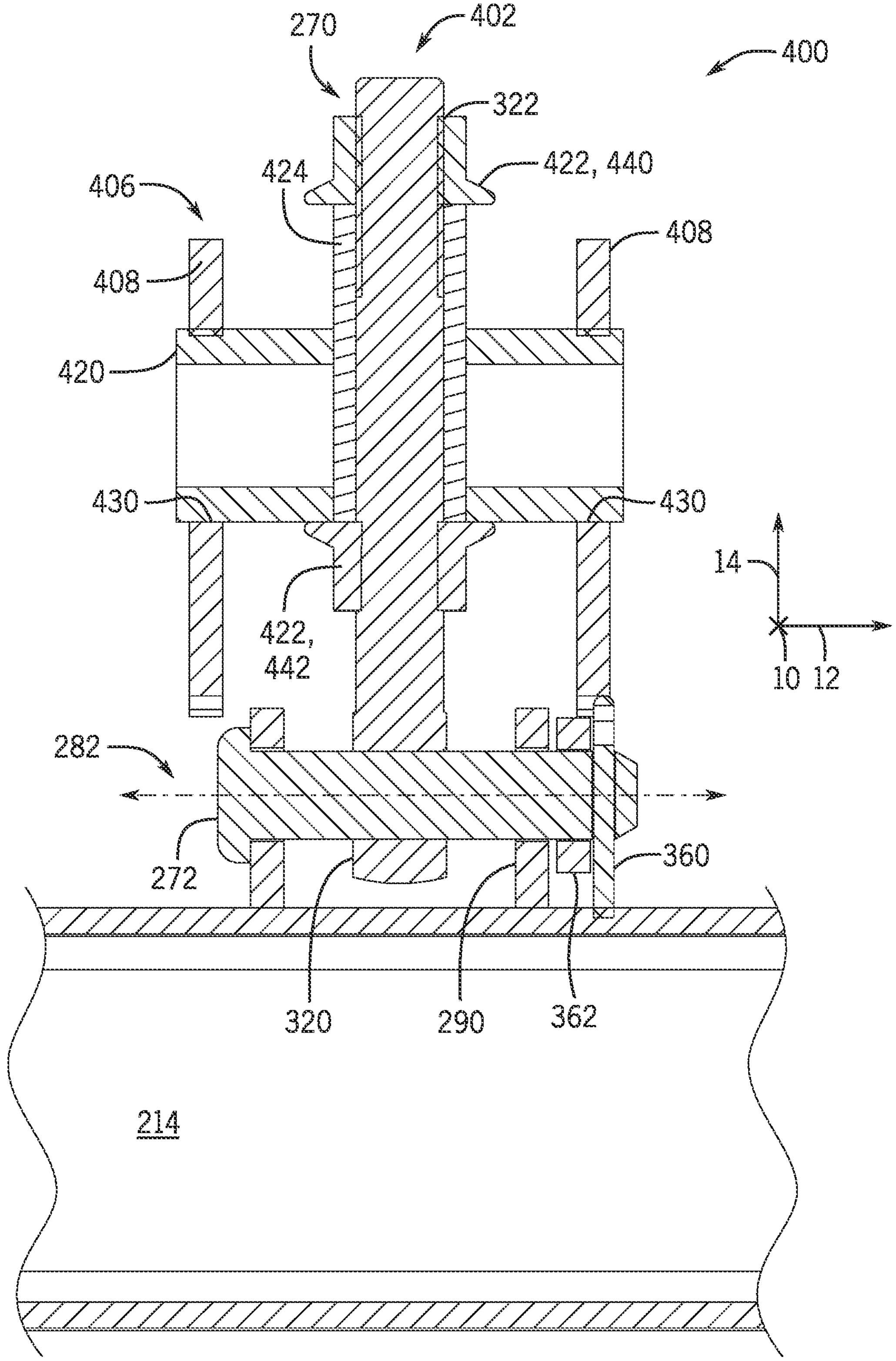
FIG. 7 is a front cross-sectional view of an embodiment of an arm assembly coupled to the frame of FIG. 3, in accordance with an aspect of the present disclosure.

FIG. 7 is a front cross-sectional view of an embodiment of an arm assembly 400 coupled to the frame 214. The arm assembly 400 may be substantially similar to the arm assembly 216 described above. As illustrated, the arm assembly 400 includes a pivoting mechanism 402 (e.g., pivot system or pivot assembly) coupled to the frame 214 via a pivot joint 404. Additionally, the arm assembly 400 includes a bracket 406 having sides 408. The arm assembly 400 may include an arm coupled to the bracket 406 and to the cutter bar assembly 202 (e.g., an arm similar to the arm 218). The pivoting mechanism 402 may limit a range of motion of the arm relative to the frame 214 and about the lateral axis 12 (e.g., about the pivot axis 282). The pivoting mechanism 402 includes the fastener 270, the additional fastener 272 that couples the fastener 270 to the frame 214, a cross-member 420, nuts 422 coupled to (e.g., threaded onto) the fastener 270, and a spacer 424 disposed along the fastener 270 between the nuts 422 and at least partially through the cross-member 420. The cross-member 420 extends at least partially through openings 430 of the sides 408 and is blocked from moving along vertical axis 14 relative to the sides 408 while disposed within the openings 430.

The arm coupled to the bracket 406 is configured to pivot about the pivot axis 264 shown in FIG. 4, such that the bracket 406 and the cross-member 420 are configured to move generally vertically along the vertical axis 14. In particular, the cross-member 420 is configured to move along the spacer 424 as the arm pivots and may contact the nuts 422 at upper and lower ends of a range of motion of the arm assembly 400, such that the nuts 422 may limit a range of motion of the cutter bar assembly 202 coupled to the arm assembly 400. For example, the cross-member 420 may contact an upper nut 440 at an upper end of the range of motion of the cross-member 420, which may correspond to a minimum height (e.g., relative to the frame 214 and/or a soil surface) of the cutter bar assembly 202 at the arm (e.g., at an end of the arm opposite of the end coupled to the bracket 406). Likewise, the cross-member 420 may contact a lower nut 442 at a lower end of the range of motion of the cross-member 420, which may correspond to a maximum height (e.g., relative to the frame 214 and/or a soil surface) of the cutter bar assembly 202 at the arm (e.g., at an end of the arm opposite of the end coupled to the bracket 406).

In certain embodiments, the range of motion of the cross-member 420 and the arm coupled to the bracket 406 may be adjusted by changing a length of the spacer 424 and/or a position of one or both nuts 422 along the fastener 270 and/or relative to ends of the fastener 270. For example, to increase a range of motion of the arm and/or the cutter bar assembly 202 coupled to the arm, a larger spacer 424 may be disposed between the nuts 422 and/or the nuts 422 may be adjusted to be farther apart from one another along the fastener 270. To decrease the range of motion of the arm and/or the cutter bar assembly 202 coupled to the arm, a smaller spacer 424 may be disposed between the nuts 422 and/or the nuts 422 may be adjusted to be closer to one another along the fastener 270. Additionally, the nuts 422 and the spacer 424 may be adjusted upwardly along the fastener 270 to adjust the range of motion of the bracket 406 upwardly to adjust the overall range of motion of the cutter assembly 202 downwardly (e.g., decrease the minimum and maximum heights of the cutter bar assembly 202 relative to the frame 214 and/or the soil surface). Further, the nuts 422 and the spacer 424 may be adjusted downwardly along the fastener 270 to adjust the range of motion of the bracket 406 downwardly to adjust the overall range of motion of the cutter assembly 202 upwardly (e.g., increase the minimum and maximum heights of the cutter bar assembly 202 relative to the frame 214 and/or the soil surface). Accordingly, the arm assembly 400 may facilitate limiting and/or adjusting the range of motion of the arm and the cutter bar assembly 202 described herein.

Figure 8:
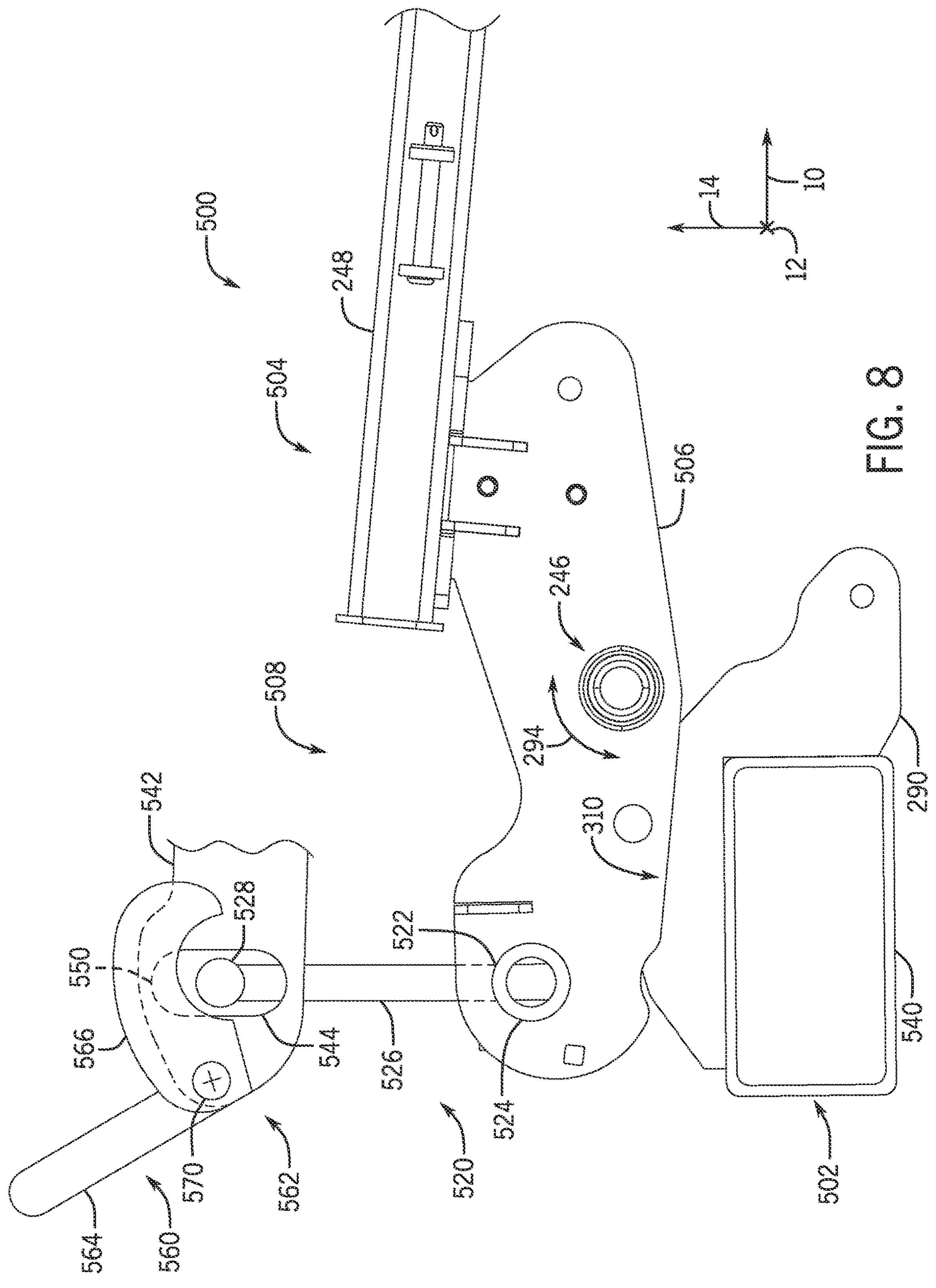
FIG. 8 is a side view of an embodiment of an arm assembly coupled to a frame, in accordance with an aspect of the present disclosure.

FIG. 8 is a side view of an embodiment of an arm assembly 500 coupled to a frame 502. The arm assembly 500 may be substantially similar to the arm assembly 216 described above, and/or the frame 502 (e.g., a frame assembly) may be substantially similar to the frame 214 described above. In particular, the arm assembly 500 includes an arm 504 having the member 248 and a bracket 506 at an end 508 of the arm assembly 500. The arm 504 is pivotally coupled to the frame 502 at the pivot joint 246 and is configured to pivot about the pivot joint 246, as indicated by the arrows 294.

Additionally, the arm assembly 500 includes a pivoting mechanism 520 (e.g., pivot system or pivot assembly) coupled to the bracket 506. The pivoting mechanism 520 includes a cross-member 522 coupled to the bracket 506 at openings 524 of the bracket 506. Additionally, the pivoting mechanism 520 includes a fastener 526 coupled to the cross-member 522 and an additional cross-member 528 coupled to the fastener 526. The frame 502 includes a member 540 and a member 542 that may be coupled (e.g., rigidly coupled) to the member 540 and/or to another portion of the frame 502. The additional cross-member 528 may extend at least partially through a slot 544 of the member 542. As the arm assembly 500 pivots about the pivot joint 246, the bracket 506 may drive the pivoting mechanism 520 to move generally vertically (e.g., generally upwardly and downwardly). For example, movement of the bracket 506 may drive the cross-member 522 and the fastener 526 to move generally vertically. In turn, movement of the fastener 526 may drive movement of the additional cross-member 528 within the slot 544.

The slot 544 includes an upper end 550 that generally defines an upper end of a range of the motion of the pivoting mechanism 520 and the end 508 of the arm assembly 500, which may correspond to a minimum height of the cutter bar assembly 202 (e.g., relative to the frame 502 and/or a soil surface). Additionally, the slot 544 includes a lower end 552 opposite the upper end 550 that generally defines a lower end of the range of the motion of the pivoting mechanism 520 and the end 508 of the arm assembly 500, which may correspond to a maximum height of the cutter bar assembly 202 (e.g., relative to the frame 502 and/or a soil surface). For example, as the arm assembly 500 pivots about the pivot joint 246, the additional cross-member 528 may contact the upper end 550 and/or the lower end 552 of the slot 544 to limit the range of motion of the arm assembly 500. In certain embodiments, the frame 502 may include an additional member coupled (e.g., rigidly coupled) to another portion of the frame 502 and disposed on an opposite side of the fastener 526 relative to the member 542. The additional member may include a slot through the cross-member 528 at least partially extends, such that the additional member limits the range of the motion of the arm assembly 500.

As illustrated, the arm assembly 500 also includes a lever assembly 560 pivotally coupled to the member 542 at a pivot joint 562. The lever assembly 560 includes a handle 564 and a stop 566 (e.g., a motion-limiting mechanism, a motion-reducing mechanism, a hook). The stop 566 may limit and/or reduce the range of motion of the arm assembly 500 while disposed in the illustrated position. In particular, the stop 566 may block the cross-member 528 from contacting the upper end 550 of the slot 544, thereby reducing the range of motion of the arm assembly 500. In some embodiments, the pivoting mechanism 520 may include the lever assembly 560 or portion(s) thereof.

The lever assembly 560 may be rotated via the handle 564, such as by an operator positioned adjacent to the header 200, to transition the lever assembly 560 between the illustrated position of blocking/reducing movement of the pivoting mechanism 520 to another position in which the lever assembly 560 is not blocking/reducing movement of the pivoting mechanism 520. For example, the other position may be achieved by rotating the handle 564 generally rearwardly and downwardly, which may drive rotation of the stop 566 generally upwardly and rearwardly. In some embodiments, the lever assembly 560 may include a locking mechanism that secures the lever assembly 560 in the illustrated position and/or in the other position.

In certain embodiments, the lever assembly 560 may include a lever 570 coupled to multiple stops 566 and/or to the handle 564. As illustrated, the lever 570 extends through the pivot joint 562 (e.g., along and parallel to the lateral axis 12). Each stop 566 may be part of a different respective arm assembly 500, such that each stop 566 is configured to limit/reduce a range of motion of the respective arm assembly 500. Movement/rotation of the handle 564, such as by the operator, may drive movement and rotation of the lever 570, thereby transitioning each of the stops 566 coupled to the lever 570 between the illustrated position of at least partially blocking/reducing the range of motion of the respective arm assembly 500 and the other position of not blocking the range of motion of the respective arm assembly 500. Accordingly, the lever assembly 560 may facilitate limiting/reducing the range of motion of the arm assembly 500, and in some embodiments, multiple arm assemblies 500, via a single input provided by the operator (e.g., movement/rotation of the handle 564).

Accordingly, an arm assembly of a header for an agricultural harvester may include an arm coupled to a cutter bar assembly and a pivoting mechanism coupled to a frame of the agricultural header. The pivoting mechanism may extend at least partially through the arm and may limit the range of motion of the arm about a pivot axis and relative to the frame. For example, a first end of the arm may be coupled to the frame at the pivot axis, and a second end of the arm may be coupled to the cutter bar assembly. The pivoting mechanism may also be coupled to the frame adjacent to the pivot axis of the arm. As the arm pivots about the pivot axis, the pivoting mechanism may limit the range of motion (e.g., pivoting motion) of the arm. The pivoting mechanism may be adjustable to adjust the range of motion of the arm and/or to maintain a level of the arm relative to other arms coupled to the cutter bar assembly, thereby maintaining a common level of the cutter bar assembly. As such, the pivoting mechanism described herein may facilitate adjustments to the arm assembly, thereby improving an efficiency and operation of the agricultural harvester.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An arm assembly of an agricultural header, the arm assembly comprising:

an arm rotatable about a first pivot axis relative to a frame of the agricultural header, the arm supporting a cutter bar assembly of the agricultural header, the arm defining at least one slot; and a pivot assembly comprising:

a fastener pivotably coupled to the frame; and a cross-member coupled to the fastener, the cross-member being received within the at least one slot such that a location of the cross-member within the at least one slot varies with relative movement between the cross-member and the arm, wherein:

the fastener extends through a portion of the cross-member; and the cross-member engages an end of the at least one slot that limits a range of motion of the arm relative to the frame.

2. The arm assembly of claim 1, wherein the pivot assembly further comprises one or more nuts coupled to the fastener; and wherein the one or more nuts couple the fastener to the cross-member.

3. The arm assembly of claim 2, wherein the one or more nuts are adjustable along a length of the fastener that adjusts the range of motion of the arm.

4. The arm assembly of claim 2, wherein the arm includes a bracket that defines the at least one slot, the cross-member and the fastener being positioned between opposed sides of the bracket, the pivot assembly further comprising a plate coupled to the fastener and extending laterally between the opposed sides of the bracket that limits a lateral range of motion of the pivot assembly.

5. The arm assembly of claim 1, wherein the cross-member comprises a cylindrical bushing, a cylindrical block, square tubing, a square block, or a combination thereof.

6. The arm assembly of claim 1, wherein the fastener pivots relative to the frame about a second pivot axis that is spaced apart from the first pivot axis.

7. The arm assembly of claim 6, wherein the cross-member extends parallel to the second pivot axis of the fastener.

8. The arm assembly of claim 6, further comprising an additional fastener coupled to the frame, wherein the fastener is pivotably coupled to the frame via the additional fastener for rotation about the second pivot axis.

9. The arm assembly of claim 6, wherein the first pivot axis and the second pivot axis are parallel to one another.

10. The arm assembly of claim 1, wherein the at least one slot comprises a first slot and a second slot;

wherein the arm comprises a bracket, the bracket including opposed first and second sides defining the first and second slots, respectively; and wherein the cross-member extends between the opposed first and second sides of the bracket and is received within the first and second slots.

11. The arm assembly of claim 10, wherein the pivot assembly further comprises first and second nuts being coupled to the fastener and positioned on the fastener along opposed sides of the cross-member.

12. The arm assembly of claim 11, wherein at least one of the first nut or the second nut is adjustable along a length of the fastener that adjusts the range of motion of the arm.

13. The arm assembly of claim 10, wherein the fastener extends through the cross-member at a location between the opposed first and second side of the bracket.

14. The arm assembly of claim 1, wherein the arm comprises:

a first end that interfaces with the pivot assembly; and a second end coupled to the cutter bar assembly, wherein the first end is opposite the second end.

15. The arm assembly of claim 1, wherein the arm is coupled to the frame at the first pivot axis.

16. An agricultural header, comprising:

a frame;

an arm rotatable about a first pivot axis relative to the frame, the arm defining at least one slot; and a pivot assembly coupled to the frame, the pivot assembly comprising:

a fastener pivotably coupled to the frame; and a cross-member coupled to the fastener, the cross-member being received within the at least one slot such that a location of the cross-member within the at least one slot varies with relative movement between the frame and the arm, wherein:

the fastener extends through a portion of the cross-member; and the cross-member engages an end of the at least one slot that limits a range of motion of the arm relative to the frame.

17. The agricultural header of claim 16, wherein the pivot assembly is adjustable to adjust a location of the range of motion of the arm.

18. The agricultural header of claim 16, wherein the fastener pivots relative to the frame about a second pivot axis that is spaced apart from the first pivot axis.

19. The agricultural header of claim 16, wherein the at least one slot comprises a first slot and a second slot;

wherein the arm comprises a bracket, the bracket including opposed first and second sides defining the first and second slots, respectively;

wherein the cross-member extends between the opposed first and second sides of the bracket and is received within the first and second slots; and wherein the fastener extends through the cross-member at a location between the opposed first and second side of the bracket.

20. The agricultural header of claim 19, wherein the pivot assembly further comprises first and second nuts being coupled to the fastener and positioned on the fastener along opposed sides of the cross-member; and wherein at least one of the first nut or the second nut is adjustable along a length of the fastener that adjusts the range of motion of the arm.

* * * * *